(12) United States Patent
Bauchot et al.

(10) Patent No.: US 8,948,738 B2
(45) Date of Patent: Feb. 3, 2015

(54) GENERATING ALERTS BASED ON PREDICTED WIRELESS CONNECTION LOSSES

(75) Inventors: Frederic Bauchot, Saint-Jeannet (FR); Jean-Yves Dispensa, St Jeannet (FR); Francois-Xavier Drouet, La Gaude (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 1249 days.

(21) Appl. No.: 12/339,183

(22) Filed: Dec. 19, 2008

(65) Prior Publication Data
US 2010/0151840 A1 Jun. 17, 2010

(30) Foreign Application Priority Data
Dec. 17, 2008 (EP) .................................. 08305959

(51) Int. Cl.
*H04M 11/00* (2006.01)
*H04W 36/00* (2009.01)
*H04W 4/00* (2009.01)
*H04W 4/02* (2009.01)
*H04M 3/487* (2006.01)
*H04L 29/08* (2006.01)
*H04W 68/00* (2009.01)
*H04W 48/04* (2009.01)

(52) U.S. Cl.
CPC .............. *H04W 4/02* (2013.01); *H04M 3/4872* (2013.01); *H04L 67/18* (2013.01); *H04W 68/00* (2013.01); *H04W 48/04* (2013.01); *H04M 2242/30* (2013.01)
USPC ........... 455/421; 455/439; 455/440; 455/441; 370/331

(58) Field of Classification Search
CPC ..... H04W 48/04; H04W 48/17; H04W 48/18; H04W 48/20; H04W 60/00; H04W 68/00; H04W 76/00–76/068
USPC ........ 455/421, 426.1, 432.1, 435.2, 436–444, 455/552.1, 553.1; 370/331
See application file for complete search history.

(56) References Cited

U.S. PATENT DOCUMENTS

| | | | |
|---|---|---|---|
| 5,392,052 A | 2/1995 | Eberwine | |
| 5,915,214 A | 6/1999 | Reece et al. | |
| 5,948,040 A | 9/1999 | DeLorme et al. | |

(Continued)

OTHER PUBLICATIONS

U.S. Appl. No. 12/339,156, filed Dec. 19, 2008; First Named Inventor Bauchot et al.

(Continued)

*Primary Examiner* — Dwayne Bost
*Assistant Examiner* — Larry Sternbane
(74) *Attorney, Agent, or Firm* — Schmeiser, Olsen & Watts; John Pivnichny (57) ABSTRACT

A method and system for generating alerts based on predicted wireless connection losses. A message is received that includes a first position of a mobile device, an indication of a service being provided to the mobile device via a wireless connection provided by a first bearer, and an mobile device identifier. A direction and speed of the mobile device is received. An amount of time elapsing before the mobile device moves to a second position at which the mobile device experiences a loss of the wireless connection via the first bearer is predicted. An alert that indicates that the loss is occurring in the amount of time is generated. The alert is sent to the mobile device as a response to the message.

12 Claims, 7 Drawing Sheets

(56) References Cited

U.S. PATENT DOCUMENTS

| | | | |
|---|---|---|---|
| 6,009,403 | A | 12/1999 | Sato |
| 6,038,444 | A * | 3/2000 | Schipper et al. .............. 455/421 |
| 6,125,278 | A * | 9/2000 | Wieczorek et al. ........... 455/437 |
| 7,130,742 | B2 | 10/2006 | Kobuya et al. |
| 7,171,220 | B2 | 1/2007 | Belcea |
| 7,536,416 | B2 | 5/2009 | Abe |
| 7,565,155 | B2 | 7/2009 | Sheha et al. |
| 7,640,098 | B2 | 12/2009 | Stenbock et al. |
| 7,720,581 | B2 | 5/2010 | Yaqub |
| 7,925,436 | B2 | 4/2011 | Blackwood |
| 8,352,175 | B2 | 1/2013 | Bauchot et al. |
| 2001/0051523 | A1* | 12/2001 | Bhatoolaul et al. ........... 455/436 |
| 2002/0029224 | A1 | 3/2002 | Carlsson |
| 2003/0069029 | A1 | 4/2003 | Dowling et al. |
| 2004/0157610 | A1* | 8/2004 | Black et al. ................... 455/443 |
| 2005/0037756 | A1* | 2/2005 | Yaguchi et al. ............... 455/436 |
| 2005/0102101 | A1 | 5/2005 | Beesley et al. |
| 2007/0093247 | A1 | 4/2007 | Yaqub |
| 2007/0298715 | A1 | 12/2007 | Blight et al. |
| 2008/0125106 | A1* | 5/2008 | Lee et al. ...................... 455/421 |
| 2008/0177461 | A1 | 7/2008 | Blackwood |
| 2010/0153001 | A1 | 6/2010 | Bauchot et al. |
| 2013/0124086 | A1 | 5/2013 | Bauchot et al. |
| 2013/0124087 | A1 | 5/2013 | Bauchot et al. |

OTHER PUBLICATIONS

Amendment filed Jan. 25, 2012 in response to Office Action (Mail Date Oct. 3, 2011) for U.S. Appl. No. 12/339,156, filed Dec. 19, 2008.
Notice of Allowance (Mail Date Aug. 30, 2012) for U.S. Appl. No. 12/339,156, filed Dec. 19, 2008.
Office Action (Mail Date Oct. 3, 2011) for U.S. Appl. No. 12/339,156, filed Dec. 19, 2008.
U.S. Appl. No. 13/732,464, filed Jan. 2, 2013.
U.S. Appl. No. 13/732,457, filed Jan. 2, 2013.
Prosecution History for U.S. Appl. No. 12/339,156, filed May 2, 2013.

* cited by examiner

| BEARER | SERVICES | | | | |
|---|---|---|---|---|---|
| | VOICE | RADIO | TV | VOD | OTHER |
| GSM | X | | | | |
| GPRS | X | X | X | X | X |
| UMTS | X | X | X | X | X |
| T-DMB | | X | X | X | X |
| DVB-H | | X | X | X | X |
| WIFI | X | | X | X | X |
| WIMAX | X | X | X | X | X |

| CONDITIONS | | | |
|---|---|---|---|
| | GSM | Y | Y |
| | WIFI | Y | Y |
| | WIMAX | N | N |
| | VOICE CALL | Y | N |
| | TV | N | Y |
| | INTERNET EMAIL | Y | N |
| ACTIONS | | | |
| | VOICE WITH GSM | Y | |
| | INTERNET WITH GSM | Y | |
| | TV ON WIFI | N | Y |

GENERATING ALERTS BASED ON PREDICTED WIRELESS CONNECTION LOSSES

RELATED APPLICATIONS

The present application is related to a co-pending application entitled "Generating Optimal Itineraries Based on Network Connectivity" Ser. No. 12/339,159 filed on the same date herewith, assigned to the assignee of the present application, and incorporated herein by reference in its entirety.

FIELD OF THE INVENTION

The present invention relates to a data processing method and system for optimizing a wireless connection by anticipating a signal loss, and more particularly to a technique for generating alerts based on predicted wireless connection losses.

BACKGROUND OF THE INVENTION

Conventional wireless connections are provided by various technologies, such as Global System for Mobile communications (GSM), code division multiple access (CDMA), 3G technologies under the International Mobile Telecommunications-2000 standard (e.g., General Packet Radio Service (GPRS) and Enhanced Data rates for GSM Evolution (EDGE)), High Speed Downlink Packet Access (HSDPA), WiFi®, Worldwide Interoperability for Microwave Access (WiMAX®), Digital Video Broadcasting Handheld (DVB-H), Terrestrial Digital Multimedia Broadcasting (T-DMB), and MediaFLO®. Mobile devices that use the conventional wireless connections have the drawback of experiencing unpredictable loss of the wireless connection or poor quality wireless bandwidth. Known techniques for addressing a mobile device's unpredictable wireless connection loss or poor quality wireless bandwidth are limited in that they are curative and reactive. Thus, there exists a need to overcome at least one of the preceding deficiencies and limitations of the related art.

SUMMARY OF THE INVENTION

In first embodiments, the present invention provides a computer-implemented method of generating alerts based on predicted wireless connection losses. The method comprises:

a computer system receiving a message that includes a first position of a mobile device, an indication of a service being provided to the mobile device via a wireless connection provided by a first bearer, and an identifier of the mobile device;

the computer system receiving a direction of the mobile device and a speed of the mobile device;

the computer system storing the first position, the indication of the service, the identifier of the mobile device, the direction and the speed in a computer data storage unit;

the computer system predicting an amount of time elapsing before the mobile device moves to a second position at which the mobile device experiences a loss of the wireless connection via the first bearer;

the computer system generating an alert that indicates that the loss is occurring in the amount of time; and the computer system sending the alert to the mobile device as a response to the message.

A system, computer program product, and process for supporting computing infrastructure corresponding to the above-summarized method are also described and claimed herein.

One or more embodiments of the present invention provide a technique for generating an alert based on a prediction of an upcoming wireless connection loss so that a user and/or an application of a mobile device is informed about the upcoming wireless connection loss. The technique disclosed herein provides high availability of a service without requiring a detection or measurement of an actual wireless connection loss or a detection or measurement of an actual degradation of signal quality.

DETAILED DESCRIPTION OF THE INVENTION

Overview

One or more embodiments of the present invention combine geo-localization with signal coverage map information that predicts a loss of a wireless connection without waiting for a signal to fade away. The technique disclosed herein may automatically generate an alert based on a prediction of an upcoming loss of a wireless connection. The alert may be sent as a response to a message that conforms to a new protocol that requires GPS positional information, service identification, and mobile device identification. The alert may include a recommended connectivity change (i.e., a swing or handover) that includes a switch from one service provider to another service provider and/or a switch from one network to another network. The service provider and/or network switch may be performed without interrupting the service. As used herein, a service is defined as a telecommunications service provided by a wireless connection.

Wireless Connection Loss Alert Generation Process

Figure 1:
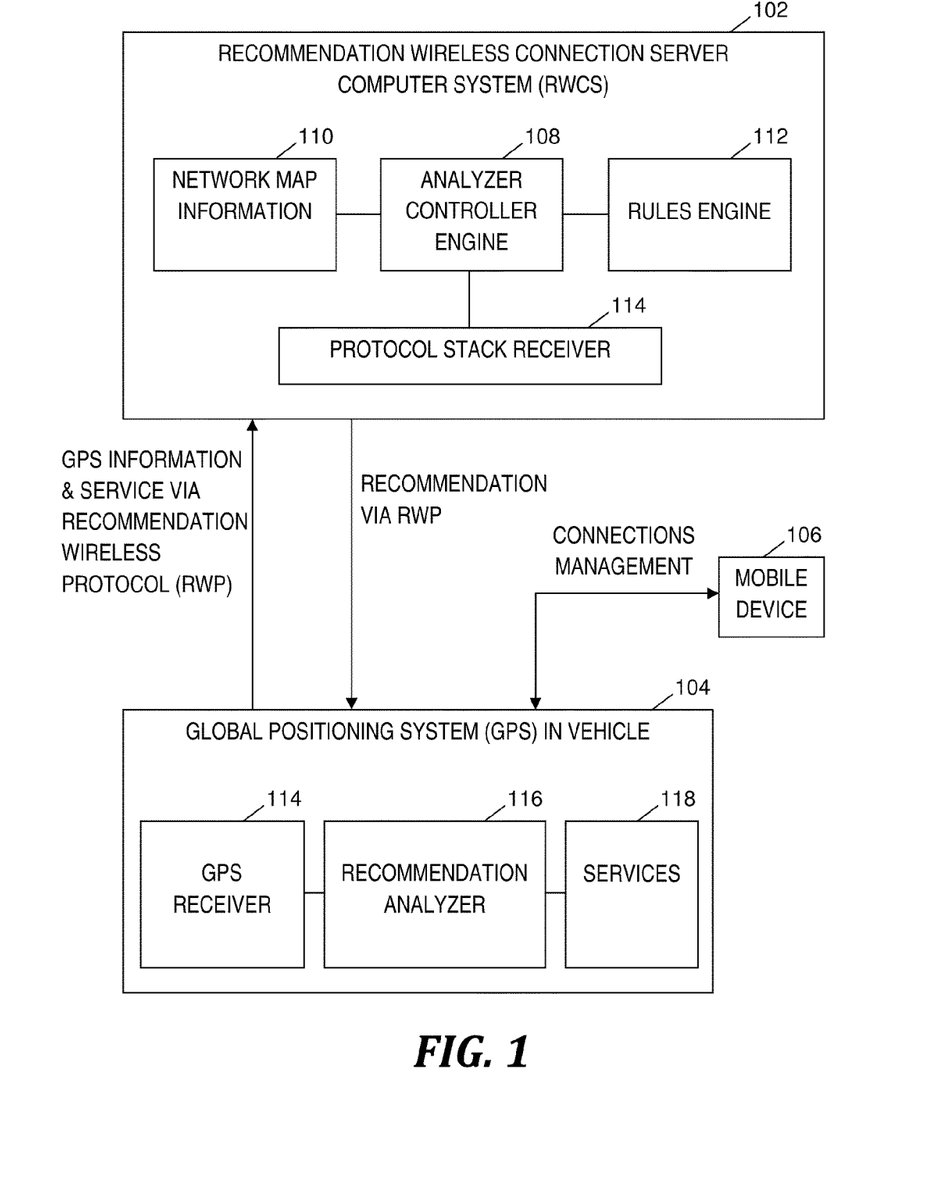
FIG. 1 is a block diagram of a system for generating alerts based on predicted wireless connection losses, in accordance with embodiments of the present invention.

FIG. 1 is a block diagram of a system for generating alerts based on predicted wireless connection losses, in accordance with embodiments of the present invention. System 100 includes a recommendation wireless connection server computer system (RWCS) 102, a global positioning system (GPS) 104, and a mobile device 106. GPS 104 is integrated in and/or transported by a vehicle. For example, global positioning device 104 may be mounted in a vehicle, placed in a vehicle without being mounted in the vehicle, carried by a traveler who is being transported by a vehicle, or carried by a traveler who is a pedestrian.

Mobile device 106 is integrated in (e.g., mounted in) and/or transported by the vehicle that includes or transports the GPS 104. Examples of mobile device 106 includes a mobile television mounted in a vehicle and a mobile phone placed in or carried in the vehicle by a traveler.

GPS 104 communicates with RWCS 102 via messages that employ a first new communications protocol referred to herein as a recommendation wireless protocol (RWP), where the messages are transmitted between GPS 104 and RWCS 102 via a means of wireless telecommunication (not shown) (e.g., wireless telecommunications network). A message that conforms to the RWP protocol is referred to herein as a RWP message. Mobile device 106 communicates with GPS 104 via messages that employ a second new communications protocol referred to herein as a connections management (CM) protocol, where the messages are transmitted between GPS 104 and mobile device 106 via, for example, a computer network (not shown).

RWCS 102 is a computer system that may include an analyzer controller engine 108, network map information 110, rules engine 112 and a protocol stack receiver 114. Analyzer controller engine 108 is a software-based component that determines a wireless connection loss prediction and generates a recommendation and/or an alert regarding the predicted wireless connection loss based on input in a RWP message that includes GPS information and an indication of a service being provided to mobile device 106 via the wireless connection.

Network map information 110 includes static signal coverage information that indicates bearer(s) that are capable of providing the service indicated in the RWP message in specified geographic areas. As used herein, a bearer is defined as a combination of a service provider and a network that is used by the service provider to provide a service. In one embodiment, network map information 110 is included in a data store residing in one or more computer data storage units (not shown) coupled to computer system 102.

Rules engine 112 is software-based component that applies a rule that uses network map information 110 to generate a recommendation that identifies a bearer to be used based on one or more predefined conditions. In one embodiment, rules engine 112 applies a rule via a decision table to generate a recommendation that identifies a bearer.

Protocol stack receiver 114 is a software-based component that defines, uses, manages, and/or processes communications protocols (e.g., the RWP protocol). As used herein, a communications protocol is defined as a set of rules for data representation, signaling, authentication and error detection required to send information over a communications channel.

Although not shown in FIG. 1, RWCS 102 stores information included in a RWP message in a memory (not shown) or a computer data storage unit (not shown) coupled to RWCS 102. The information included in the RWP message is described in more detail below relative to the discussion of FIG. 2.

GPS 104 may include a GPS receiver 114, a recommendation analyzer 116, and services 118. GPS receiver 114 is a device that receives and decodes GPS satellite broadcasts and may present (e.g., display) a geographic position and speed of a vehicle. Recommendation analyzer 116 is a software-based component that receives and automatically analyzes a recommendation received in a RWP message (i.e., RWP response message) sent from RWCS 102. Services 118 are one or more indications of one or more services used by mobile device 106, where the indication(s) are stored in a computer data storage device and are retrievable by recommendation analyzer 116. GPS 104 sends a message using the CM protocol to direct a change in a connection from mobile device 106 to a network and/or service provider based on the recommendation received in a RWP response message.

In one alternate embodiment, one or more components shown in GPS 104 are included in mobile device 106 instead of in the global positioning device. In another alternate embodiment, the GPS 104 is included in mobile device 106.

In still another alternate embodiment, a geo-localization function provided by the GPS receiver 114 may be provided by a geo-localization component included in GPS 104 or in another device, where the geo-localization component uses a triangulation technique (e.g., triangulation of GSM base stations) to determine the position of the vehicle.

In one embodiment, GPS 104 sends a message in the RWP protocol to RWCS 102, where the RWP message includes a current geographic location and speed of a vehicle and a service being provided to mobile device 106 via a wireless connection. RWCS 102 sends a RWP response message to GPS 104, where the RWP response includes an alert and/or a recommendation, where the alert notifies a user of a predicted wireless connection loss and the recommendation includes bearer to which the wireless connection used by mobile device 106 may be switched in order to maintain the service after the predicted wireless connection loss occurs. For example, the recommendation may include a change from a first service provider to a second service provider that provides the service to mobile device 106 and/or a change from a first network to a second network used by a service provider to provide the service to mobile device 106.

In one embodiment, GPS 104 sends a message in the CM protocol to mobile device 106 to direct mobile device 106 to switch from a first service provider to a second service provider, a first network to a second network, or a combination thereof.

In one embodiment, GPS 104 is a computer system and a memory is coupled to GPS 104. A computer data storage unit may also be coupled to GPS 104. The memory or computer data storage unit coupled to GPS 104 stores information included in a RWP message discussed below relative to FIG. 2.

As used herein, a vehicle is defined as a mode of conveyance or transport in or by which someone travels. For example, a vehicle may be a motor-driven conveyance (e.g., automobile, bus or truck), a rail transport conveyance (e.g., train, subway car, cable car), a watercraft (e.g., boat, ship, or ferry), an aircraft (e.g., airplane or helicopter), animal-powered transport (e.g., carriage or sled), or human-powered transport (e.g., a bicycle or walking). As used herein, a mobile device is defined as a computing device used for mobile audio, visual, data and/or voice communication via a mobile telecommunications network of base stations. For example, a mobile device may be a mobile phone (i.e., wireless phone, cell phone or cellular phone), a mobile television, a laptop computer, a digital radio, or digital audio player (e.g., MP3 player).

Wireless Connection Loss Alert Generation Process

Figure 2:
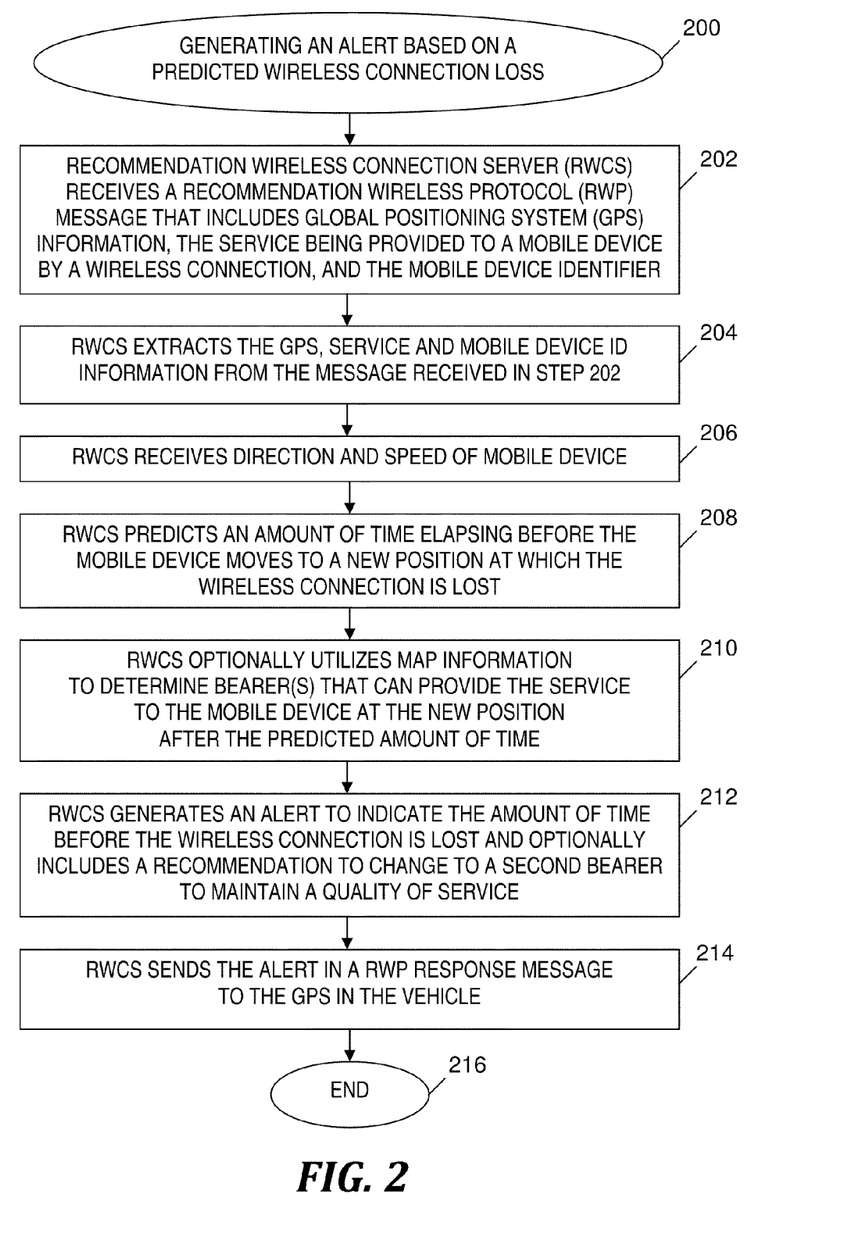
FIG. 2 is a flowchart of an alert generation process implemented by the system of FIG. 1, in accordance with embodiments of the present invention.

FIG. 2 is a flowchart of an alert generation process implemented by the system of FIG. 1, in accordance with embodiments of the present invention. The alert generation process begins at step 200. In step 202, RWCS 102 (see FIG. 1) periodically receives a RWP message that includes a current geographic position (e.g., coordinates) of mobile device 106 (see FIG. 1) as determined by GPS 104 (see FIG. 1), an identification of a service being provided to mobile device 106 (see FIG. 1) by a wireless connection via a first bearer, an identifier (a.k.a. mobile device ID) of mobile device 106 (see FIG. 1), and an indication of whether the GPS is included in mobile device 106 (see FIG. 1). In one embodiment, RWCS 102 (see FIG. 1) receives the RWP message in step 202 via the first bearer, which is currently being used by mobile device 106 (see FIG. 1).

In step 204, RWCS 102 (see FIG. 1) extracts information from the RWP message received in step 202, including the current geographic position, the identification of the service, and the mobile device ID. In one embodiment, RWCS 102 (see FIG. 1) stores the information extracted in step 204 into a RWCS database table, which is included in a computer data storage unit coupled to RWCS 102. The RWCS database table includes records, where each record associates a mobile device ID, the service currently being used by a mobile device identified by the mobile device ID, the bearer currently being used by the mobile device, the current position and speed of the mobile device (see step 206 below), and an amount of time before the service is predicted to be lost (see step 208 below). In one embodiment, the process of FIG. 2 transforms RWCS 102 from a computer that is coupled to a computer data storage unit that does not include a current geographic position of a mobile device, an identification of a service being provided to the mobile device, and an identifier of the mobile device to a computer that is coupled to a computer data storage unit that does include a current geographic position of a mobile device, an identification of a service being provided to the mobile device, and an identifier of the mobile device.

In one embodiment, each record of the RWCS database table also includes an old geographic position and an elapsed time (i.e., an amount of time taken by the mobile device to travel from the old geographic position to the current geographic position. In the embodiment described in this paragraph, RWCS 102 (see FIG. 1) determines a speed of the mobile device based on the elapsed time and a distance between the old geographic position and the current geographic position.

In step 206, RWCS 102 (see FIG. 1) receives a speed and a direction (i.e., displacement vector) of mobile device 106 (see FIG. 1). In one embodiment, GPS 104 sends the speed and direction of mobile device 106 (see FIG. 1) to RWCS 102 (see FIG. 1). In another embodiment, analyzer controller engine 108 (see FIG. 1) uses the aforementioned elapsed time and a distance between the aforementioned old and current geographic positions to determine the speed and direction of the mobile device.

In step 208, analyzer controller engine 108 (see FIG. 1) generates a prediction of an amount of time that elapses from the current time before mobile device 106 (see FIG. 1) moves to a new geographic position at which the mobile device will experience a loss of the wireless connection via the first bearer. The wireless connection may be lost based on, for example, poor propagation of the wave or an overload of a base station. Generating the prediction in step 208 includes analyzer controller engine 108 (see FIG. 1) retrieving signal coverage map information from network map information 110 (see FIG. 1) to determine that the first bearer cannot provide the wireless connection at the new geographic position or that the first bearer cannot provide the wireless connection at least at a predefined signal quality. The prediction generated in step 208 is based on the current position of mobile device 106 (see FIG. 1) extracted from the RWP message in step 204, the speed and direction of the mobile device received in step 206, and the retrieved signal coverage map information.

For example, the current position, speed and direction determine a new geographic position that the mobile device will reach and a time at which the mobile device will reach the new geographic position. The signal coverage map information indicates that the wireless connection via the first bearer (see step 202) will be lost when the mobile device is at the new geographic position. The amount of time in the prediction generated in step 208 may be determined as the difference between the time at which the mobile device is at the current geographic position and the time at which the mobile device will be at the new geographic position.

In one embodiment, RWCS 102 (see FIG. 1) utilizes a geographical information system (GIS) to analyze future positions of mobile device 106 (see FIG. 1) and coverage maps from network map information 110 (see FIG. 1) to determine a position at which the mobile device loses its wireless connection (i.e., the aforementioned new geographic position).

In step 210, RWCS 102 (see FIG. 1) optionally determines one or more bearers that can provide the service to mobile device 106 (see FIG. 1) when the mobile device is at the new geographic position (see step 208) after the amount of time predicted in step 208 elapses. The determination of the one or more bearers includes the RWCS retrieving signal coverage map information from network map information 110 (see FIG. 1), where the signal coverage map information identifies, for each bearer, a first set of geographic positions at which the wireless connection via the bearer will not be lost and a second set of geographic positions at which the wireless connection via the bearer will be lost.

For example, the coverage map retrieved from network map information 110 (see FIG. 1) may indicate that GPRS, but not DVB-H, is able to provide digital television to a mobile device when the mobile device reaches new geographic position X,Y after an amount of time T elapses, as predicted in step 208.

In step 212, RWCS 102 (see FIG. 1) generates an alert to indicate the amount of time before the wireless connection is lost (i.e., the amount of time predicted in step 208). In one embodiment, step 212 also includes the RWCS determining a recommendation for a connectivity change. That is, the RWCS determines a recommendation for mobile device 106 (see FIG. 1) to change the wireless connection from the first bearer to a second bearer to maintain a quality of service that exceeds a predefined level. The first bearer is different from the second bearer. If RWCS 102 (see FIG. 1) determines a recommendation in step 212, then the alert generated in step 212 includes the recommendation. In one embodiment, the RWCS determines a recommendation by retrieving and applying a rule from rules engine 112 (see FIG. 1). The application of the rule may include determining that one or more conditions of a decision table are satisfied and retrieving an action from the decision table, where the decision table associates the action with the one or more conditions that are satisfied.

For example, the alert generated in step 212 may indicate that a mobile device receiving a digital television program needs to be reconnected to a GPRS network rather than DVB-H network during an upcoming period of time, and that there will be a downgrade in quality of service during that upcoming period of time.

In step 214, RWCS 102 (see FIG. 1) sends the alert generated in step 212 as a RWP response message to GPS 104 (see FIG. 1). The alert generation process ends at step 216.

In one embodiment, steps 202, 204, 206, 208 and 210 are performed periodically according to a predetermined schedule.

In one embodiment, the process of FIG. 2 is performed without detecting an actual decline in a signal quality for a signal being received by mobile device 106 (see FIG. 1).

In one embodiment, the RWP is described as having the following types of messages: a client start, a client notification, and an alert. GPS 104 (see FIG. 1) sends a client start message or a client notification message to RWCS 102 (see FIG. 1). RWCS 102 (see FIG. 1) sends an alert to GPS 104 (see FIG. 1).

The client start message has the format RWP-start(UID, list of wireless services, an optional exchange elapsed_time), where the UID is an identifier of a mobile device, the list of wireless services indicate service(s) being provided to the mobile device, and the optional exchange elapsed_time specifies the elapsed time between a determination of an old location of the mobile device and a current location of the mobile device. The RWCS 102 (see FIG. 1) responds to the client start message with either an "Accept request" that accepts the request in the client start message or a "reject-error(erno)", where erno identifies an error that causes a rejection of the client start.

The client notification message has the format RWP-notify (Service_type, current_location, old_location, elapsed_time), where Service_type is a type of a service being provided to the mobile device, current_location is a current geographical position of the mobile device as determined by GPS 104 (see FIG. 1), old_location is a previous geographical position of the mobile device as determined by GPS 104 (see FIG. 1), and elapsed_time is the amount of time taken for the mobile device to travel from old_location to current_location. In one embodiment, the client notification message allows the RWCS 102 (see FIG. 1) to determine the speed and direction of mobile device 106 (see FIG. 1) without storing this information for multiple mobile devices. That is, GPS 104 (see FIG. 1), rather than RWCS 102 (see FIG. 1), determines and stores the speed and direction of the mobile device.

The alert message has the format RWP-alert(Remaining time, New wireless service), where "Remaining time" is the period of time left before the predicted loss of a wireless connection. If a "New wireless service" is specified in the alert message, then a hand-over to the bearer indicated by the "New wireless service" must be performed during the "Remaining time".

Figure 3:
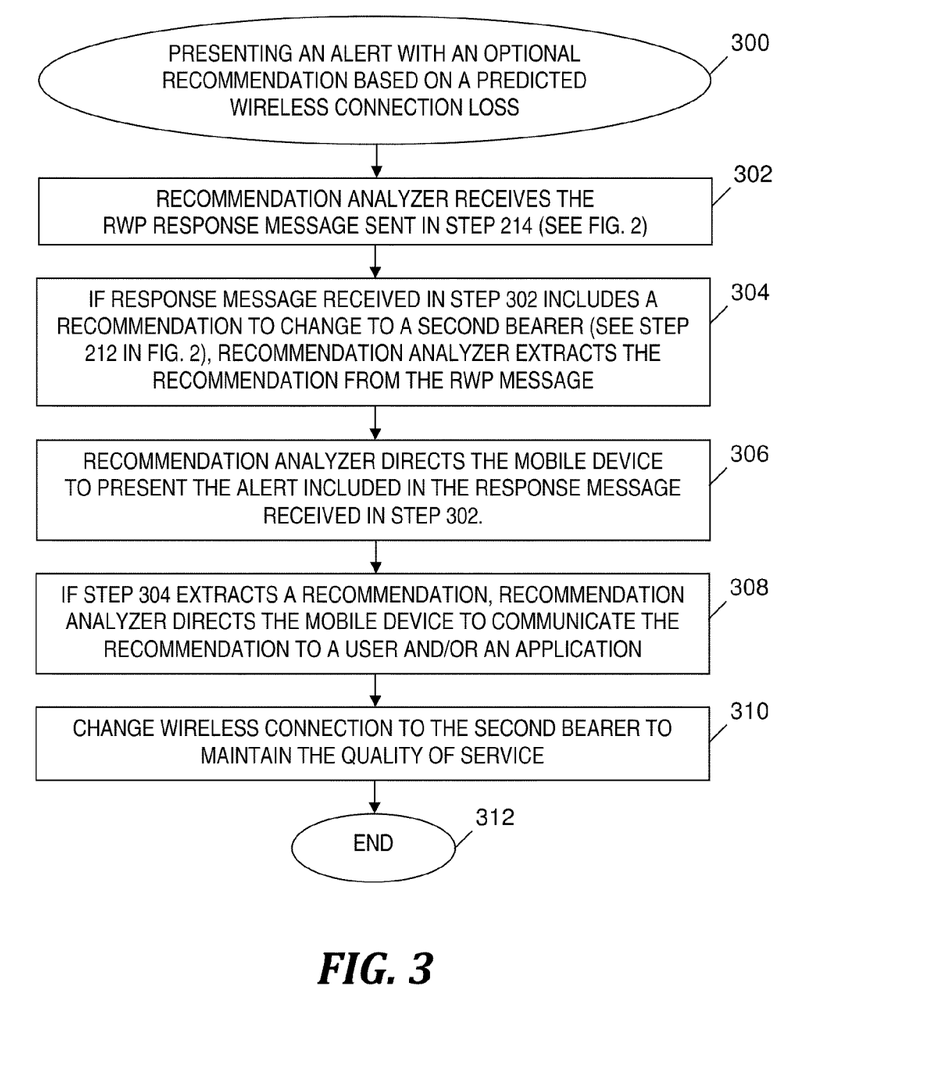
FIG. 3 is a flowchart of a process for presenting an alert with an optional recommendation generated by the process of FIG. 2, in accordance with embodiments of the present invention.

FIG. 3 is a flowchart of a process for presenting an alert with an optional recommendation generated by the process of FIG. 2, in accordance with embodiments of the present invention. The process for presenting an alert with an optional recommendation begins at step 300. In step 302, recommendation analyzer 116 (see FIG. 1) receives the RWP response message sent in step 214 (see FIG. 2).

In step 304, if the RWP response message received in step 302 includes the aforementioned recommendation for a connectivity change from a first bearer to a second bearer (see step 212 in FIG. 2), then recommendation analyzer 116 (see FIG. 1) extracts the recommendation from the RWP response message. For example, recommendation analyzer 116 (see FIG. 1) extracts an indication of the second bearer to which mobile device 106 (see FIG. 1) is to switch its wireless connection.

In step 306, recommendation analyzer 116 (see FIG. 1) directs mobile device 106 (see FIG. 1) to communicate (i.e., present) the alert included in the RWP response message received in step 302. For example, recommendation analyzer 116 (see FIG. 1) initiates the generation of an audio tone, a vocal notification, or a visual display that presents the alert to a user.

If step 304 extracts a recommendation, then in step 308, recommendation analyzer 116 (see FIG. 1) directs mobile device 106 (see FIG. 1) to communicate the recommendation to a user and/or an application. For example, the recommendation analyzer 116 (see FIG. 1) displays the recommendation to a user via a display device.

In step 310, mobile device 106 changes its wireless connection from the first bearer to the second bearer to maintain the service at a signal quality that meets a predefined threshold level. The process for presenting an alert with an optional recommendation ends at step 312. In one embodiment, the changing of the wireless connection in step 310 is initiated by a user based on the user receiving the recommendation extracted in step 308. In another embodiment, the changing of the wireless connection in step 310 is automatically performed in response to an application of the mobile device receiving the recommendation in step 308.

EXAMPLES

Figure 4:
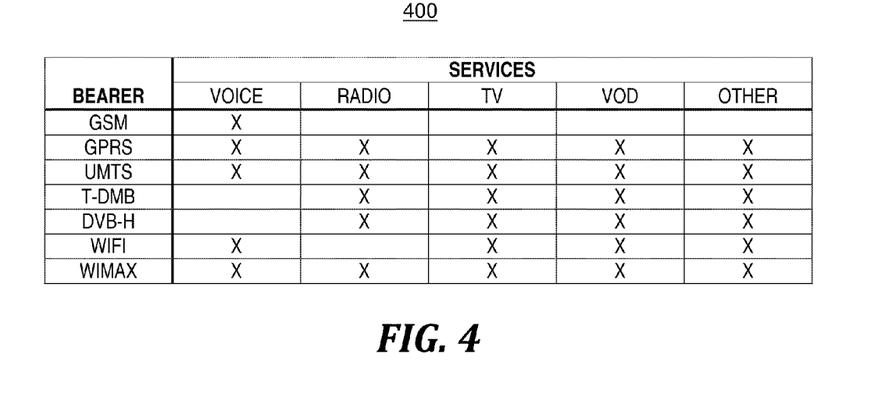
FIG. 4 is an exemplary table used in the process of FIG. 2 to map services to bearers providing support thereto, in accordance with embodiments of the present invention.

FIG. 4 is an exemplary table used in the process of FIG. 2 to map services to bearers providing support thereto, in accordance with embodiments of the present invention. Table 400 is associated with a starting geographic position A and an ending geographic position B. When mobile device 106 (see FIG. 1) is along a route from A to B, table 400 indicates what services are available and via what bearers. Table 400 is used, for example, in step 210 (see FIG. 2) to determine a bearer that can provide a service to mobile device 106 (see FIG. 1) when the mobile device reaches a specified new geographic position. For example, the "X" indicators in the column labeled "VOD" in table 400 indicate that the video on demand (VOD) service is available from the following bearers: GPRS, UMTS (Universal Mobile Telecommunications System), T-DMB, DVB-H, WiFi® and WiMAX®.

Figure 5:
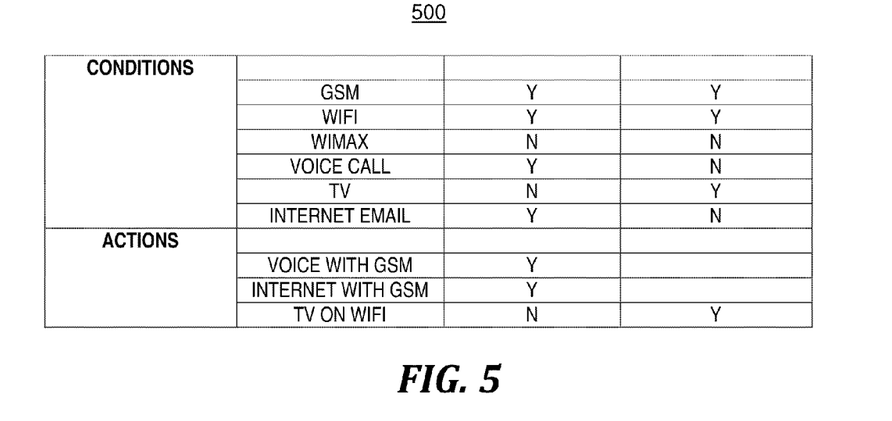
FIG. 5 is an exemplary decision table used by a rules engine in the process of FIG. 2 to determine a recommended action, in accordance with embodiments of the present invention.

FIG. 5 is an exemplary decision table used by a rules engine in the process of FIG. 2 to determine a recommended action, in accordance with embodiments of the present invention. Rules engine 112 (see FIG. 1) determines if the conditions of decision table 500 are satisfied and includes an action corresponding to the satisfied conditions in the recommendation included in step 212 of FIG. 2. For example, if rules engine 112 (see FIG. 1) determines that digital television is included in services 118 (see FIG. 1) (i.e., as shown by the "Y" indicator in the row labeled "TV" in table 500), then a recommendation to provide a digital television service by WiFi® is included in the recommendation in step 212 (see FIG. 2).

Figure 6:
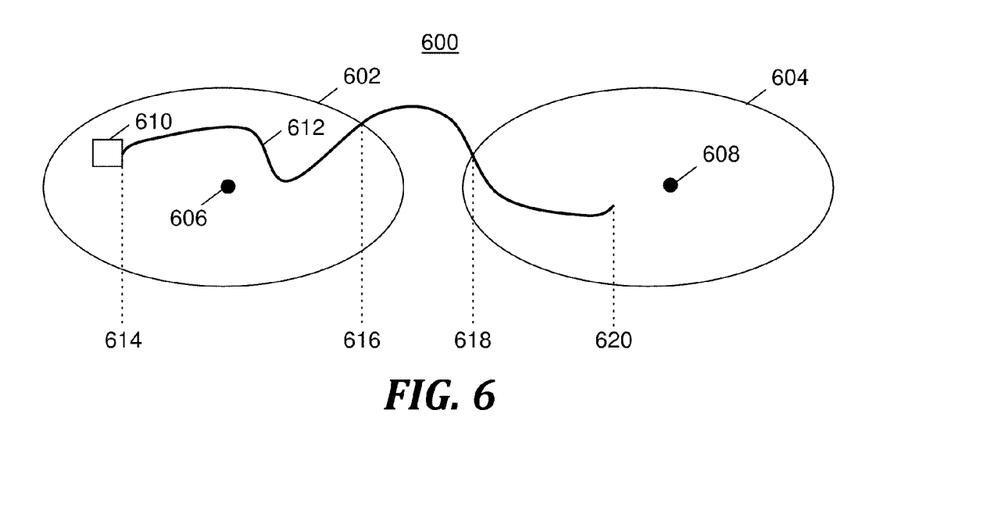
FIG. 6 depicts a first exemplary itinerary that includes a geographic position associated with an alert generated by the process of FIG. 2, in accordance with embodiments of the present invention.

FIG. 6 depicts a first exemplary itinerary that includes a geographic position associated with an alert generated by the process of FIG. 2, in accordance with embodiments of the present invention. Example 600 includes a first GSM coverage area 602 and a second GSM coverage area 604. Area 602 and area 604 are serviced by base station 606 and base station 608, respectively. Mobile device 610 is traveling in a vehicle over route 612 from starting point 614, via point 616 and point 618, and finishing at ending point 620. A user is using mobile device 610 for voice telephony. Between points 616 and 618, the GSM connectivity between base station 606 and mobile device 610 will be lost. After mobile device 610 passes point 618 on route 612, GSM connectivity between base station 608 and mobile device 610 will be established. In a predefined amount of time before mobile device 610 reaches point 616, RWCS 102 (see FIG. 1) generates an alert (see step 212 in FIG. 2) and sends the alert to mobile device 610, at which the alert may be received by a user. The alert is a notification about the upcoming loss of GSM connectivity on base station 606 that will be experienced by mobile device 610. In response to receiving the alert, the user of mobile device 610 may stop moving the mobile device along route 612 in order to finish the communication by voice telephony before reaching point 616.

Figure 7:
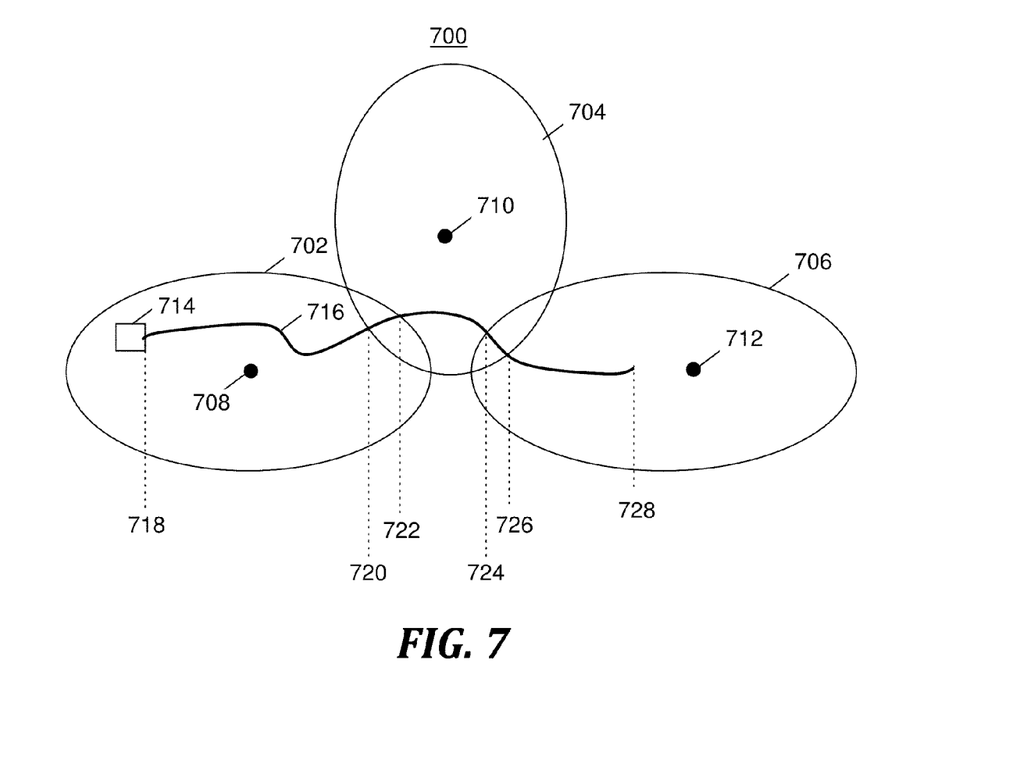
FIG. 7 depicts a second exemplary itinerary that includes geographic positions associated with alerts generated by the process of FIG. 2, in accordance with embodiments of the present invention.

FIG. 7 depicts a second exemplary itinerary that includes geographic positions associated with alerts generated by the process of FIG. 2, in accordance with embodiments of the present invention. Example 700 includes a first DVB-H coverage area 702, a GPRS coverage area 704, and a second DVB-H coverage area 706. Areas 702, 704 and 706 are serviced by base stations 708, 710 and 712, respectively. Mobile device 714 is traveling in a vehicle over route 716 from starting point 718, via points 720, 722, 724, and 726, in succession, and finishing at ending point 728. Mobile device 714 is receiving a digital television service. Between points 722 and 724, mobile device 714 will lose DVB-H connectivity for the digital television service via base station 708. After mobile device 714 passes point 724, DVB-H connectivity will be established via base station 712. Between points 720 and 726, the digital television service may be maintained using GPRS provided by base station 710. In a predefined amount of time before mobile device 714 reaches point 722, RWCS 102 (see FIG. 1) generates an alert (see step 212 in FIG. 2) and sends the alert to mobile device 714 in a RWP response message (see step 214 in FIG. 2). In response to receiving the RWP response message (see step 302 in FIG. 3), an application of mobile device 714 automatically switches the wireless connection from DVB-H provided by base station 708 to GPRS provided by base station 710 (see step 310 in FIG. 3).

Figure 8:
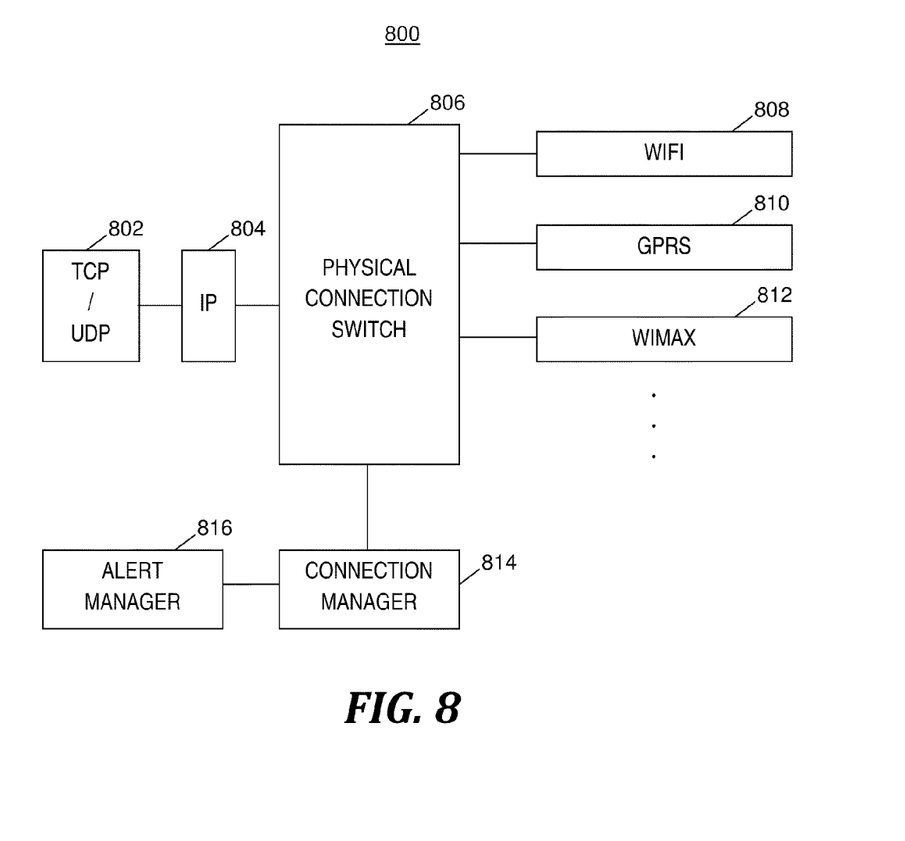
FIG. 8 depicts an exemplary architecture of a mobile device included in the system of FIG. 1, in accordance with embodiments of the present invention.

FIG. 8 depicts an exemplary architecture of a mobile device included in the system of FIG. 1, in accordance with embodiments of the present invention. In one embodiment, mobile device 106 has an architecture 800. Architecture 800 includes a component 802 for processing a communication that uses the Transmission Control Protocol (TCP) or User Datagram Protocol (UDP), a component 804 for processing a communication that uses the Internet Protocol (IP), and a physical connection switch 806 that switches an IP communication to an available protocol stack (e.g., a protocol stack for WiFi® 808, GPRS 810, WiMAX® 812, etc.). Architecture 800 also includes a connection manager 814 and an alert manager 816. Connection manager 814 controls physical connection switch 806. Alert manager 816 controls connection manager 814. A TCP/UDP session is not impacted by the protocol stack switching performed by physical connection switch 806. In one embodiment, alert manager 816 includes recommendation analyzer 116 and informs a user of an upcoming loss of a wireless connection being used by the mobile device 106 (see FIG. 1) by presenting an alert (see steps 306 and 308 of FIG. 3).

Computing System

Figure 9:
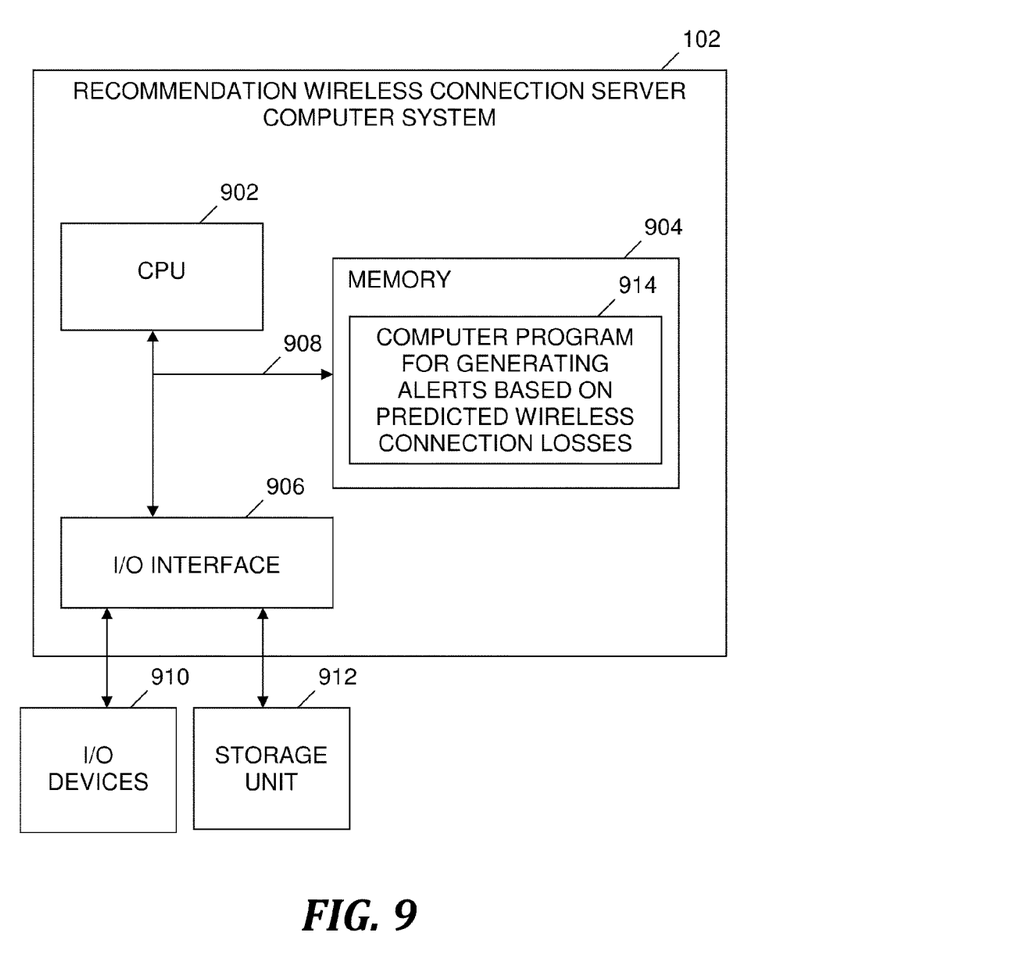
FIG. 9 is a computer system that is included in the system of FIG. 1 and that implements the process of FIG. 2, in accordance with embodiments of the present invention.

FIG. 9 is a computer system that is included in the system of FIG. 1 and that implements the processes of FIGS. 2 and 3, in accordance with embodiments of the present invention. Computer system 102 generally comprises a central processing unit (CPU) 902, a memory 904, an input/output (I/O) interface 906, and a bus 908. Further, computer system 102 is coupled to I/O devices 910 and a computer data storage unit 912. CPU 902 performs computation and control functions of computer system 102. CPU 902 may comprise a single processing unit, or be distributed across one or more processing units in one or more locations (e.g., on a client and server).

Memory 904 may comprise any known type of computer data storage and/or transmission media, including bulk storage, magnetic media, optical media, random access memory (RAM), read-only memory (ROM), a data cache, a data object, etc. In one embodiment, cache memory elements of memory 904 provide temporary storage of at least some program code (e.g., code 914) in order to reduce the number of times code must be retrieved from bulk storage during execution. Moreover, similar to CPU 902, memory 904 may reside at a single physical location, comprising one or more types of data storage, or be distributed across a plurality of physical systems in various forms. Further, memory 904 can include data distributed across, for example, a local area network (LAN) or a wide area network (WAN).

I/O interface 906 comprises any system for exchanging information to or from an external source. I/O devices 910 comprise any known type of external device, including a display device (e.g., monitor), keyboard, mouse, printer, speakers, handheld device, facsimile, etc. Bus 908 provides a communication link between each of the components in computer system 102, and may comprise any type of transmission link, including electrical, optical, wireless, etc.

I/O interface 906 also allows computer system 102 to store and retrieve information (e.g., data or program instructions such as code 914) from an auxiliary storage device such as computer data storage unit 912 or another computer data storage unit (not shown). Computer data storage unit 912 may be a non-volatile storage device, such as a magnetic disk drive (i.e., hard disk drive) or an optical disc drive (e.g., a CD-ROM drive which receives a CD-ROM disk).

Memory 904 includes computer program code 914 that provides the logic for generating alerts based on predicted wireless connection losses (e.g., the process of FIG. 2) In one embodiment, code 914 is included in computer system 102 (see FIG. 1) and provides logic for the process of FIG. 2. In another embodiment, code 914 is included in GPS 104 (see FIG. 1) and provides logic for the process of FIG. 3. Further, memory 904 may include other systems not shown in FIG. 9, such as an operating system (e.g., Linux) that runs on CPU 902 and provides control of various components within and/or connected to computer system 102.

Memory 904, storage unit 912, and/or one or more other computer data storage units (not shown) that are coupled to computer system 102 may store network map information 110 (see FIG. 1), rules applied by rules engine 112 (see FIG. 1), values included in a RWP message sent by the process of FIG. 2, and values included in a message that uses the CM protocol.

As will be appreciated by one skilled in the art, the present invention may be embodied as a system, method or computer program product. Accordingly, an embodiment of the present invention may be an entirely hardware embodiment, an entirely software embodiment (including firmware, resident software, micro-code, etc.) or an embodiment combining software and hardware aspects that may all generally be referred to herein as a "system" (e.g., system 100 of FIG. 1 or computer system 102 of FIG. 9). Furthermore, an embodiment of the present invention may take the form of a computer program product embodied in any tangible medium of expression (e.g., memory 904 or computer data storage unit 912) having computer-usable program code (e.g., code 914) embodied or stored in the medium.

Any combination of one or more computer-usable or computer-readable medium(s) (e.g., memory 904 and computer data storage unit 912) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program 914 is printed, as the program 914 can be electronically captured via, for instance, optical scanning of the paper or other medium, then compiled, interpreted, or otherwise processed in a suitable manner, if necessary, and then stored in a computer memory 904. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code (e.g., program 914) embodied therewith, either in baseband or as part of a carrier wave. The computer-usable program code may be transmitted using any appropriate medium, including but not limited to wireless, wireline, optical fiber cable, RF, etc.

Computer program code (e.g., code 914) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server (e.g., computer system 102). In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIGS. 2 and 3) and/or block diagrams of methods, apparatus (systems) (e.g., FIG. 1 and FIG. 9), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 914). These computer program instructions may be provided to a processor (e.g., CPU 902) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 904 or computer data storage unit 912) that can direct a computer (e.g., computer system 102) or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computer system 102) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process for generating alerts based on predicted wireless connection losses. Thus, an embodiment of the present invention discloses a process for supporting computer infrastructure, comprising integrating, hosting, maintaining and deploying computer-readable code (e.g., code 914) into a computer system (e.g., computer system 102), wherein the code in combination with the computer system is capable of performing a process for generating alerts based on predicted wireless connection losses.

In another embodiment, the invention provides a business method that performs the process steps of the invention on a subscription, advertising and/or fee basis. That is, a service provider, such as a Solution Integrator, can offer to create, maintain, support, etc. a process for generating alerts based on predicted wireless connection losses. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2 and 3 and the block diagrams in FIGS. 1, 8 and 9 illustrate the architecture, functionality, and operation of possible implementations of systems, methods, and computer program products according to various embodiments of the present invention. In this regard, each block in the flowchart or block diagrams may represent a module, segment, or portion of code (e.g., code 914), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of generating an alert based on a predicted wireless connection loss, said method comprising:
   a computer system receiving a message that includes a current geographic position of a mobile device, an indication of a service being provided to said mobile device via a wireless connection provided by a first bearer, and an identifier of said mobile device;
   said computer system receiving a direction of said mobile device and a speed of said mobile device;
   said computer system storing said current geographic position, said indication of said service, said identifier of said mobile device, said direction and said speed in a computer data storage unit;
   said computer system retrieving a signal coverage map that indicates bearers that provide said service in respective geographic areas;
   based on said current geographic position, said direction, and said speed, said computer system determining (1) a new geographic position to which said mobile device will move from said current geographic position and (2) a time at which said mobile device will reach said new geographic position;
   based on said retrieved signal coverage map and without detecting a degradation in a quality of a signal received by said mobile device via said wireless connection provided by said first bearer, said computer system determining said mobile device will experience a loss of said wireless connection provided by said first bearer at said time at which said mobile device will reach said new geographic position;
   based on said current geographic position, said direction, said speed, and said retrieved signal coverage map, and without detecting said degradation in said a quality of said signal received by said mobile device via said wireless connection provided by said first bearer, said computer system predicting an amount of time elapsing before said mobile device will move to said new geographic position at which said mobile device will experience said loss of said wireless connection provided by said first bearer, said predicting including determining said amount of time is a difference between said time at which said mobile device will reach said new geographic position and a current time at which said mobile device is at said current geographic position;
   based on said retrieved signal coverage map, said computer system determining a second bearer to provide said service to said mobile device at said time at which said mobile device will reach said new geographic position, said second bearer being different from said first bearer;
   said computer system generating an alert that indicates that said loss will occur in said amount of time and that includes a recommendation for said mobile device to change said wireless connection from being provided by a first combination of a first service provider and a first network that defines said first bearer to being provided by a second combination of a second service provider and a second network that defines said second bearer to continue said service being provided to said mobile device without experiencing said loss of said wireless connection; and
   in response to said receiving said message, said computer system sending said alert to said mobile device, wherein a result of said sending said alert is said mobile device receiving said service without said loss of said wireless connection by said mobile device changing said wireless connection from being provided by said first combination of said first service provider and said first network that defines said first bearer to said wireless connection being provided by said second combination of said second service provider and said second network that defines said second bearer.

2. The method of claim 1, wherein said determining said second bearer includes retrieving an identification of said second bearer from a data store based on said signal coverage map indicating a signal coverage for said service by said second bearer at one of said geographic areas which includes said new geographic position.

3. The method of claim 1, further comprising:
   said computer system extracting said recommendation from a response to said message; and
   said computer system directing, in response to said extracting said recommendation, said mobile device to present said recommendation to a user of said mobile device or an application of said mobile device.

4. The method of claim 1, wherein a result of said sending said alert is a presentation of said alert to a user of said mobile device.

5. A computer system comprising a processor and a computer-readable memory unit coupled to said processor, said memory unit containing instructions that when executed by said processor implement a method of generating an alert based on a predicted wireless connection loss, said method comprising:
   said computer system receiving a message that includes a current geographic position of a mobile device, an indication of a service being provided to said mobile device via a wireless connection provided by a first bearer, and an identifier of said mobile device;
   said computer system receiving a direction of said mobile device and a speed of said mobile device;
   said computer system storing said current geographic position, said indication of said service, said identifier of said mobile device, said direction and said speed in a computer data storage unit;
   said computer system retrieving a signal coverage map that indicates bearers that provide said service in respective geographic areas;
   based on said current geographic position, said direction, and said speed, said computer system determining (1) a new geographic position to which said mobile device will move from said current geographic position and (2) a time at which said mobile device will reach said new geographic position;
   based on said retrieved signal coverage map and without detecting a degradation in a quality of a signal received by said mobile device via said wireless connection provided by said first bearer, said computer system determining said mobile device will experience a loss of said wireless connection provided by said first bearer at said time at which said mobile device will reach said new geographic position;
   based on said current geographic position, said direction, said speed, and said retrieved signal coverage map, and without detecting said degradation in said quality of said signal received by said mobile device via said wireless connection provided by said first bearer, said computer system predicting an amount of time elapsing before said mobile device will move to a second position at which said mobile device will experience a loss of said wireless connection provided by said first bearer, said predicting including determining said amount of time is a difference between said time at which said mobile device will reach said new geographic position and a current time at which said mobile device is at said current geographic position;

based on said retrieved signal coverage map, said computer system determining a second bearer to provide said service to said mobile device at said time at which said mobile device will reach said new geographic position, said second bearer being different from said first bearer;

said computer system generating an alert that indicates that said loss will occur in said amount of time and that includes a recommendation for said mobile device to change said wireless connection from being provided by a first combination of a first service provider and a first network that defines said first bearer to being provided by a second combination of a second service provider and a second network that defines said second bearer to continue said service being provided to said mobile device without experiencing said loss of said wireless connection; and in response to said receiving said message, said computer system sending said alert to said mobile device, wherein a result of said sending said alert is said mobile device receiving said service without said loss of said wireless connection by said mobile device changing said wireless connection from being provided by said first combination of said first service provider and said first network that defines said first bearer to said wireless connection being provided by said second combination of said second service provider and said second network that defines said second bearer.

6. The computer system of claim 5, wherein said determining said second bearer includes retrieving an identification of said second bearer from a data store based on said signal coverage map indicating a signal coverage for said service by said second bearer at one of said geographic areas which includes said new geographic position.

7. The computer system of claim 5, wherein said method further comprises:
said computer system extracting said recommendation from a response to said message; and
said computer system directing, in response to said extracting said recommendation, said mobile device to present said recommendation to a user of said mobile device or an application of said mobile device.

8. A computer program product, comprising;
a tangible computer-readable storage device having a computer-readable program code stored therein, said computer-readable program code containing instructions configured to be executed by a processor of a computer system to implement a method of generating an alert based on a predicted wireless connection loss, said method comprising:
said computer system receiving a message that includes a current geographic position of a mobile device, an indication of a service being provided to said mobile device via a wireless connection provided by a first bearer, and an identifier of said mobile device;
said computer system receiving a direction of said mobile device and a speed of said mobile device;
said computer system storing said current geographic position, said indication of said service, said identifier of said mobile device, said direction and said speed in a computer data storage unit;
said computer system retrieving a signal coverage map that indicates bearers that provide said service in respective geographic areas;

based on said current geographic position, said direction, and said speed, said computer system determining (1) a new geographic position to which said mobile device will move from said current geographic position and (2) a time at which said mobile device will reach said new geographic position;

based on said retrieved signal coverage map and without detecting a degradation in a quality of a signal received by said mobile device via said wireless connection provided by said first bearer, said computer system determining said mobile device will experience a loss of said wireless connection provided by said first bearer at said time at which said mobile device will reach said new geographic position;

based on said current geographic position, said direction, said speed, and said retrieved signal coverage map, and without detecting said degradation in said quality of said signal received by said mobile device via said wireless connection provided by said first bearer, said computer system predicting an amount of time elapsing before said mobile device will move to said new geographic a position at which said mobile device will experience said loss of said wireless connection provided by said first bearer, said predicting including determining said amount of time is a difference between said time at which said mobile device will reach said new geographic position and a current time at which said mobile device is at said current geographic position;

based on said retrieved signal coverage map, said computer system determining a second bearer to provide said service to said mobile device at said time at which said mobile device will reach said new geographic position, said second bearer being different from said first bearer;

said computer system generating an alert that indicates that said loss will occur in said amount of time and that includes a recommendation for said mobile device to change said wireless connection from being provided by a first combination of a first service provider and a first network that defines said first bearer to being provided by a second combination of a second service provider and a second network that defines said second bearer to continue said service being provided to said mobile device without experiencing said loss of said wireless connection; and in response to said receiving said message, said computer system sending said alert to said mobile device, wherein a result of said sending said alert is said mobile device receiving said service without said loss of said wireless connection by said mobile device changing said wireless connection from being provided by said first combination of said first service provider and said first network that defines said first bearer to said wireless connection being provided by said second combination of said second service provider and said second network that defines said second bearer.

9. The program product of claim 8, wherein said determining said second bearer includes retrieving an identification of said second bearer from a data store based on said signal coverage map indicating a signal coverage for said service by said second bearer at one of said geographic areas which includes said new geographic position.

10. The program product of claim 8, wherein said method further comprises:
said computer system extracting said recommendation from a response to said message; and said computer system directing, in response to said extracting said recommendation, said mobile device to present said recommendation to a user of said mobile device or an application of said mobile device.

11. A process for supporting computing infrastructure, said process comprising providing at least one support service for at least one of creating, integrating, hosting, maintaining, and deploying computer-readable code in a computer system, wherein the code in combination with the computer system is capable of performing a method of generating an alert based on a predicted wireless connection loss, said method comprising:

said computer system receiving a message that includes a current geographic position of a mobile device, an indication of a service being provided to said mobile device via a wireless connection provided by a first bearer, and an identifier of said mobile device;

said computer system receiving a direction of said mobile device and a speed of said mobile device;

said computer system storing said current geographic position, said indication of said service, said identifier of said mobile device, said direction and said speed in a computer data storage unit;

said computer system retrieving a signal coverage map that indicates bearers that provide said service in respective geographic areas;

based on said current geographic position, said direction, and said speed, said computer system determining (1) a new geographic position to which said mobile device will move from said current geographic position and (2) a time at which said mobile device will reach said new geographic position;

based on said retrieved signal coverage map and without detecting a degradation in a quality of a signal received by said mobile device via said wireless connection provided by said first bearer, said computer system determining said mobile device will experience a loss of said wireless connection provided by said first bearer at said time at which said mobile device will reach said new geographic position;

based on said current geographic position, said direction, said speed, and said retrieved signal coverage map, and without detecting said degradation in said quality of said signal received by said mobile device via said wireless connection provided by said first bearer, said computer system predicting an amount of time elapsing before said mobile device will move to said new geographic position at which said mobile device will experience said loss of said wireless connection provided by said first bearer, said predicting including determining said amount of time is a difference between said time at which said mobile device will reach said new geographic position and a current time at which said mobile device is at said current geographic position;

based on said retrieved signal coverage map, said computer system determining a second bearer to provide said service to said mobile device at said time at which said mobile device will reach said new geographic position, said second bearer being different from said first bearer;

generating an alert that indicates that said loss will occur in said amount of time and that includes a recommendation for said mobile device to change said wireless connection from being provided by a first combination of a first service provider and a first network that defines said first bearer to being provided by a second combination of a second service provider and a second network that defines said second bearer to continue said service being provided to said mobile device without experiencing said loss of said wireless connection; and in response to said receiving said message, said computer system sending said alert to said mobile device, wherein a result of said sending said alert is said mobile device receiving said service without said loss of said wireless connection by said mobile device changing said wireless connection from being provided by said first combination of said first service provider and said first network that defines said first bearer to said wireless connection being provided by said second combination of said second service provider and said second network that defines said second bearer.

12. The process of claim 11, wherein said determining said second bearer includes retrieving an identification of said second bearer from a data store based on said signal coverage map indicating a signal coverage for said service by said second bearer at one of said geographic areas which includes said new geographic position.

* * * * *